United States Patent [19]

Hwang

[11] Patent Number: 5,021,792
[45] Date of Patent: Jun. 4, 1991

[54] SYSTEM FOR DETERMINING DIRECTION OR ATTITUDE USING GPS SATELLITE SIGNALS

[75] Inventor: Patrick Y. Hwang, Cedar Rapids, Iowa

[73] Assignee: Rockwell International Corporation, El Segundo, Calif.

[21] Appl. No.: 464,271

[22] Filed: Jan. 12, 1990

[51] Int. Cl.[5] .......................... H04B 7/185; G01S 5/02
[52] U.S. Cl. .................................................... 342/357
[58] Field of Search ............... 342/357, 394, 356, 445, 342/446

[56] References Cited

U.S. PATENT DOCUMENTS

| | | |
|---|---|---|
| 3,766,556 | 10/1973 | Amoroso, Jr. . |
| 4,719,469 | 1/1988 | Beier et al. ........................... 342/434 |
| 4,845,502 | 7/1989 | Carr et al. ............................ 342/430 |
| 4,881,080 | 11/1989 | Jablonski ............................. 342/357 |

Primary Examiner—Theodore M. Blum
Attorney, Agent, or Firm—John J. Horn; M. Lee Murrah; H. Fredrick Hamann

[57] ABSTRACT

A system for determining spatial orientation based on the carrier phase of signals received from a set of GPS satellites. The system comprises an antenna array including a number of antennas coupled to GPS radio receivers, a mechanism for reconfiguring the positions of the antennas within the array and a signal processing module for processing the data collected by the antennas and the receivers. The mechanism for reconfiguring the antenna array is adapted for exchanging the positions of one pair of antennas and for rearranging the antennas from collinear into non-collinear patterns. Phase measurements are taken by the antennas and their associated receivers, both before and after antenna exchange and after antenna rearrangement in order to provide the data necessary to determine direction or attitude.

15 Claims, 3 Drawing Sheets

$$
\begin{bmatrix}
\Delta\phi_{01}^{(1)-} & \Delta\phi_{01}^{(2)-} \\
\Delta\phi_{01}^{(2)-} & \Delta\phi_{01}^{(3)-} \\
\Delta\phi_{01}^{(3)-} & \Delta\phi_{01}^{(4)-} \\
\Delta\phi_{21}^{(1)-} & \Delta\phi_{21}^{(2)-} \\
\Delta\phi_{21}^{(2)-} & \Delta\phi_{21}^{(3)-} \\
\Delta\phi_{21}^{(3)-} & \Delta\phi_{21}^{(4)-} \\
\Delta\phi_{01}^{(1)+} & \Delta\phi_{01}^{(2)+} \\
\Delta\phi_{01}^{(2)+} & \Delta\phi_{01}^{(3)+} \\
\Delta\phi_{01}^{(3)+} & \Delta\phi_{01}^{(4)+} \\
\Delta\phi_{21}^{(1)+} & \Delta\phi_{21}^{(2)+} \\
\Delta\phi_{21}^{(2)+} & \Delta\phi_{21}^{(3)+} \\
\Delta\phi_{21}^{(3)+} & \Delta\phi_{21}^{(4)+}
\end{bmatrix}
=
\begin{bmatrix}
(h_x^{(1)-}-h_x^{(2)-}), & (h_y^{(1)-}-h_y^{(2)-}), & (h_z^{(1)-}-h_z^{(2)-}), & 0,0,0,1,0,0,0,0,0 \\
(h_x^{(2)-}-h_x^{(3)-}), & (h_y^{(2)-}-h_y^{(3)-}), & (h_z^{(2)-}-h_z^{(3)-}), & 0,0,0,0,1,0,0,0,0 \\
(h_x^{(3)-}-h_x^{(4)-}), & (h_y^{(3)-}-h_y^{(4)-}), & (h_z^{(3)-}-h_z^{(4)-}), & 0,0,0,0,0,1,0,0,0 \\
2(h_x^{(1)-}-h_x^{(2)-}), & 2(h_y^{(1)-}-h_y^{(2)-}), & 2(h_z^{(1)-}-h_z^{(2)-}), & 0,0,0,0,0,0,1,0,0 \\
2(h_x^{(2)-}-h_x^{(3)-}), & 2(h_y^{(2)-}-h_y^{(3)-}), & 2(h_z^{(2)-}-h_z^{(3)-}), & 0,0,0,0,0,0,0,1,0 \\
2(h_x^{(3)-}-h_x^{(4)-}), & 2(h_y^{(3)-}-h_y^{(4)-}), & 2(h_z^{(3)-}-h_z^{(4)-}), & 0,0,0,0,0,0,0,0,1 \\
0,0,0, & -(h_x^{(1)+}-h_x^{(2)+}), & -(h_y^{(1)+}-h_y^{(2)+}), & -(h_z^{(1)+}-h_z^{(2)+}), 1,0,0,0,0,0 \\
0,0,0, & -(h_x^{(2)+}-h_x^{(3)+}), & -(h_y^{(2)+}-h_y^{(3)+}), & -(h_z^{(2)+}-h_z^{(3)+}), 0,1,0,0,0,0 \\
0,0,0, & -(h_x^{(3)+}-h_x^{(4)+}), & -(h_y^{(3)+}-h_y^{(4)+}), & -(h_z^{(3)+}-h_z^{(4)+}), 0,0,1,0,0,0 \\
0,0,0, & (h_x^{(1)+}-h_x^{(2)+}), & (h_y^{(1)+}-h_y^{(2)+}), & (h_z^{(1)+}-h_z^{(2)+}), 0,0,0,1,0,0 \\
0,0,0, & (h_x^{(2)+}-h_x^{(3)+}), & (h_y^{(2)+}-h_y^{(3)+}), & (h_z^{(2)+}-h_z^{(3)+}), 0,0,0,0,1,0 \\
0,0,0, & (h_x^{(3)+}-h_x^{(4)+}), & (h_y^{(3)+}-h_y^{(4)+}), & (h_z^{(3)+}-h_z^{(4)+}), 0,0,0,0,0,1
\end{bmatrix}
\begin{bmatrix}
\Delta x- \\ \Delta y- \\ \Delta z- \\ \Delta x+ \\ \Delta y+ \\ \Delta z+ \\ N_{01}^{(1,2)} \\ N_{01}^{(2,3)} \\ N_{01}^{(3,4)} \\ N_{21}^{(1,2)} \\ N_{21}^{(2,3)} \\ N_{21}^{(3,4)}
\end{bmatrix}
$$

FIG 4

FIG 7A $\quad U_1 = \dfrac{[X_A, Y_A, Z_A]^T}{\sqrt{X_A^2+Y_A^2+Z_A^2}}$

FIG 7B $\quad U_2 = \dfrac{[X_B, Y_B, Z_B]^T}{\sqrt{X_B^2+Y_B^2+Z_B^2}}$ $$\begin{bmatrix} N^{(1,2)}_{01} \\ N^{(2,3)}_{01} \\ N^{(3,4)}_{01} \\ N^{(1,2)}_{21} \\ N^{(2,3)}_{21} \\ N^{(3,4)}_{21} \end{bmatrix} = \begin{bmatrix} 2/3, 0, 0, -1/3, 0, 0, 1/3, 0, 0, 1/3, 0, 0, \\ 0, 2/3, 0, 0, -1/3, 0, 0, 1/3, 0, 0, 1/3, 0 \\ 0, 0, 2/3, 0, 0, -1/3, 0, 0, 1/3, 0, 0, 1/3 \\ -2/3, 0, 0, 1/3, 0, 0, 2/3, 0, 0, 2/3, 0, 0 \\ 0, -2/3, 0, 0, 1/3, 0, 0, 2/3, 0, 0, 2/3, 0 \\ 0, 0, -2/3, 0, 0, 1/3, 0, 0, 2/3, 0, 0, 2/3 \end{bmatrix} \begin{bmatrix} \Delta\phi^{(1)-}_{01} - \Delta\phi^{(2)-}_{01} \\ \Delta\phi^{(2)-}_{01} - \Delta\phi^{(3)-}_{01} \\ \Delta\phi^{(3)-}_{01} - \Delta\phi^{(4)-}_{01} \\ \Delta\phi^{(1)-}_{21} - \Delta\phi^{(2)-}_{21} \\ \Delta\phi^{(2)-}_{21} - \Delta\phi^{(3)-}_{21} \\ \Delta\phi^{(3)-}_{21} - \Delta\phi^{(4)-}_{21} \\ \Delta\phi^{(1)+}_{01} - \Delta\phi^{(2)+}_{01} \\ \Delta\phi^{(2)+}_{01} - \Delta\phi^{(3)+}_{01} \\ \Delta\phi^{(3)+}_{01} - \Delta\phi^{(4)+}_{01} \\ \Delta\phi^{(1)+}_{21} - \Delta\phi^{(2)+}_{21} \\ \Delta\phi^{(2)+}_{21} - \Delta\phi^{(3)+}_{21} \\ \Delta\phi^{(3)+}_{21} - \Delta\phi^{(4)+}_{21} \end{bmatrix}$$

FIG 5

$$\begin{bmatrix} \Delta\phi^{(1)}_{01} - \phi^{(2)}_{01} - N^{(1,2)}_{01} \\ \Delta\phi^{(2)}_{01} - \phi^{(3)}_{01} - N^{(2,3)}_{01} \\ \Delta\phi^{(3)}_{01} - \phi^{(4)}_{01} - N^{(3,4)}_{01} \end{bmatrix} = \begin{bmatrix} -(h^{(1)}_x - h^{(2)}_x), -(h^{(1)}_y - h^{(2)}_y), -(h^{(1)}_z - h^{(2)}_z) \\ -(h^{(2)}_x - h^{(3)}_x), -(h^{(2)}_y - h^{(3)}_y), -(h^{(2)}_z - h^{(3)}_z) \\ -(h^{(3)}_x - h^{(4)}_x), -(h^{(3)}_y - h^{(4)}_y), -(h^{(3)}_z - h^{(4)}_z) \end{bmatrix} \begin{bmatrix} X_A \\ Y_A \\ Z_A \end{bmatrix}$$

$$\begin{bmatrix} \Delta\phi^{(1)}_{21} - \phi^{(2)}_{21} - N^{(1,2)}_{21} \\ \Delta\phi^{(2)}_{21} - \phi^{(3)}_{21} - N^{(2,3)}_{21} \\ \Delta\phi^{(3)}_{21} - \phi^{(4)}_{21} - N^{(3,4)}_{21} \end{bmatrix} = \begin{bmatrix} (h^{(1)}_x - h^{(2)}_x), (h^{(1)}_y - h^{(2)}_y), (h^{(1)}_z - h^{(2)}_z) \\ (h^{(2)}_x - h^{(3)}_x), (h^{(2)}_y - h^{(3)}_y), (h^{(2)}_z - h^{(3)}_z) \\ (h^{(3)}_x - h^{(4)}_x), (h^{(3)}_y - h^{(4)}_y), (h^{(3)}_z - h^{(4)}_z) \end{bmatrix} \begin{bmatrix} X_B \\ Y_B \\ Z_B \end{bmatrix}$$

FIG 6A

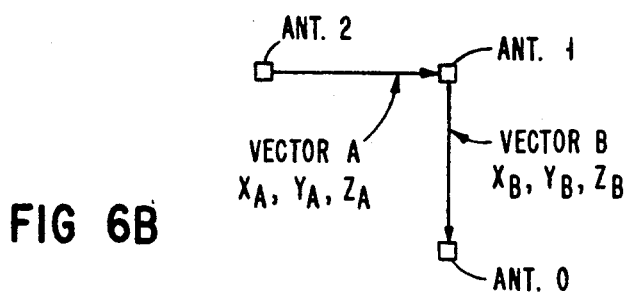

FIG 6B

SYSTEM FOR DETERMINING DIRECTION OR ATTITUDE USING GPS SATELLITE SIGNALS

BACKGROUND OF THE INVENTION

The present invention relates to GPS Navigation Satellite Systems and more particularly to systems which make use of the carrier phase of signals provided by GPS satellites.

GPS Navigation Systems include a constellation of satellites each of which provides a coded signal which may be picked up by radio receivers on the surface of the earth. Separate coded signals from a set of satellites may be processed by a receiver system for use in determining location as defined by latitude and longitude based on the code carried by the signals. The operation of GPS Systems in determining location based on coded signals received from satellites reflects the conventional functioning of such systems.

However, it has been found that the signals generated by GPS satellites may be used in other ways and in particular the carrier phase of the signals may be used in certain surveying applications. For example, a pair of stationary antenna/receiver combinations may be located at the ends of a baseline (whose length is required to be determined) and used to track and measure the phase of a GPS carrier signal arriving at their respective antenna locations. The situation may be described by Equation 1:

$$\phi_A - \phi_B = COS\theta * \Delta X \text{ or}$$

$$\Delta \phi = \Delta \phi_O + \Delta \phi_N = COS\theta * \Delta X \quad (1)$$

Where:
$\Phi_A$ = phase measured by antenna A at point A
$\Phi_B$ = phase measured by antenna B al point B
$\Delta \Phi_O$ = measured phase difference
$\Delta \Phi_N$ = initial integer (phase) ambiguity in whole cycles
$\theta$ = angle between the horizontal and the signal path from the satellite to point A (or B)
$\Delta X$ = distance between points A and B in which the total phase delay may be seen as indeterminate due to the nature of oscillatory signals since an unknown number of whole cycles may be involved. This unknown quantity $\Delta \Phi_N$ is commonly referred to as the initial integer ambiguity and can only be resolved by additional steps in a surveying procedure. For static surveying, the simplest manner of resolving the initial integer ambiguity is by observing carrier phase over a period of time. It is clear from Equation 1 that the two unknowns $\Delta \Phi_N$ and $\Delta X$ cannot be solved with one measurement equation at a single instant in time. However, with a second measurement $\Delta \Phi_1$ made at a different time $T_1$, the measurement situation becomes two dimensional in nature as indicated by matrix Equation 2:

$$\begin{bmatrix} \Delta \phi_0 \\ \Delta \phi_1 \end{bmatrix} = \begin{bmatrix} \cos\theta_0 & -1 \\ \cos\theta_1 & -1 \end{bmatrix} \begin{bmatrix} \Delta X \\ \Delta \phi_N \end{bmatrix} \quad (2)$$

Where:
the subscripts 0 and 1 indicate measurements at different points in time
and the distance $\Delta X$ may be readily determined. In real life three-dimensional GPS static surveying, the amount of time necessary to obtain a solution is typically on the order of twenty to forty minutes for relatively short baselines.

It may be appreciated how the principles given above can be extended to kinematic surveying applications so long as the phase of the carrier signal is continuously tracked. Continuity in the carrier phase profile provides the user with an exact history of positional changes of a roving antenna provided that some sort of initialization procedure has been used to resolve the initial integer ambiguity prior to antenna displacement. The situation may be described by Equation 3:

$$\Delta \Phi - \Delta \Phi_N + \delta \Phi = COS\theta * \Delta X + COS\theta * \delta X \quad (3)$$

where:
$\delta \phi$ = measured phase increment
$\delta X$ = distance increment

Since the variables $\Delta \Phi_N$ and $\Delta X$ should have already been solved from the initialization, this leaves only $\delta X$ which can be solved instantaneously from a single phase tracking measurement $\delta \Phi$. Kinematic surveying in accordance with the above procedures constitutes the primary application of GPS carrier phase techniques since distances may be easily derived from the carrier phase tracking measurements as long as continuous carrier tracking is maintained after initialization.

In order to speed up the resolution of the initial integer ambiguity during initialization, an alternative technique may be employed called "antenna exchange" as first introduced by B. W. Remondi in his article "Kinematic and Pseudo-kinematic GPS" in the Proceedings of the Satellite Division of the Institute Of Navigation's First International Technical Meeting in Colorado Springs, Colo. in 1985. B. W. Remondi suggested that by moving one antenna to the location of the other the total phase delay can be solved just as effectively as waiting for satellites to move appreciably. However, since there is no way to physically merge two antennas that need to occupy exactly the same location, the most effective approach is simply to exchange or swap the locations of the two antennas at the ends of the baseline. Antenna exchange can therefore be interpreted as kinematic movement of one antenna by an amount equal to $2*\Delta X$ while the other is kept stationary. This situation may be described by Equation 4:

$$\Delta \Phi_O + \delta \Phi = COS \theta * (\Delta X - 2*\Delta X) - \Delta \Phi_N \quad (4)$$

Measurements before and after the antenna exchange result in two simultaneous equations as shown in matrix Equation 5:

$$\begin{bmatrix} \Delta \phi_0 \\ \Delta \phi_0 + \delta \phi \end{bmatrix} = \begin{bmatrix} \cos\theta & -1 \\ -\cos\theta & -1 \end{bmatrix} \begin{bmatrix} \Delta X \\ \Delta \phi_N \end{bmatrix} \quad (5)$$

which may be readily solved to determine the initial integer ambiguity $\Delta \Phi_N$ and baseline distance $\Delta X$.

The foregoing discussion indicates how the phase of GPS signals may be used in determining distances in surveying applications and how antenna exchange may allow for rapid "initialization." However, surveying applications have appeared to be the limit of the usefulness of carrier phase information derived from GPS satellite signals.

It is an object of the present invention to provide a system adapted for determining spatial orientation based on phase measurements of GPS satellite signals.

It is a further object of the present invention to provide a system for determining direction and/or attitude using an antenna array including antennas which may be configured in different patterns and which are each adapted for receiving and measuring the phase of signals from a set of GPS satellites.

It is another object of the present invention to provide a system for determining spatial orientation using GPS signals which may be employed on large scale vehicles such as ships and which is accurate in operation, economic to implement and reliable in service.

SUMMARY OF THE INVENTION

The present invention constitutes a system for determining attitude and/or direction (i.e. spatial orientation) based on the carrier phase of signals received from a set of GPS satellites. The system comprises an antenna array including a number of antennas coupled to GPS radio receivers, a mechanism for reconfiguring the positions of the antennas in the array and a signal processing unit for processing the data collected by the antennas and receivers. The mechanism for reconfiguring the positions of the antennas within the antenna array is constructed for enabling one pair of antennas to be exchanged and for allowing the antennas to be rearranged from collinear into non-collinear patterns. The antennas and receivers are used in taking samples and tracking the carrier phase of GPS signals received from a number of different satellites. These measurements are taken both before and after the positions of an antenna pair is exchanged in order to provide the information necessary to determine direction. Further, phase measurements may also be taken after the positions of the antennas are rearranged in order to provide the information necessary to determine attitude.

In the preferred embodiment, three collinear antennas are initially spaced apart by equal distances and are separately connected to three receivers. Carrier phase measurements are taken by each of the antenna/receiver combinations with respect to signals from four different satellites. The positions of two of the antennas are then exchanged while continuous phase tracking is maintained and phase measurements are again taken by each of the antenna/receiver combinations with respect to signals from the same four satellites. The antennas are then rearranged from their collinear to a non-collinear pattern while continuous phase tracking is again maintained and phase measurements are again taken by each of the antenna/receiver combinations with respect to signals from the same four satellites. The phase information gathered pursuant to the foregoing measurements is then processed by a microprocessor system in which the phase ambiguities between the signals are resolved and the components of vectors representing the orientation of the antenna array are calculated based on the phase information.

BRIEF DESCRIPTION OF THE DRAWINGS

FIG. 4 provides a system of matrix equations representing conditions before and after antenna exchange which may be solved in accordance with phase measurements to yield vectors indicating direction Where:
- − and + superscripts refer to conditions before and after antenna exchange
- numerical superscripts (in parentheses) comprise indexes referencing particular satellites and double superscripts denote differences between measurements associated with different satellites
- numerical subscripts comprise indexes denoting particular antennas and referring to particular pairings of antennas
- $h_x$, $h_y$, $h_z$ comprise unit direction vector, to the satellites indicated by the superscripts (i).

Figure 1:
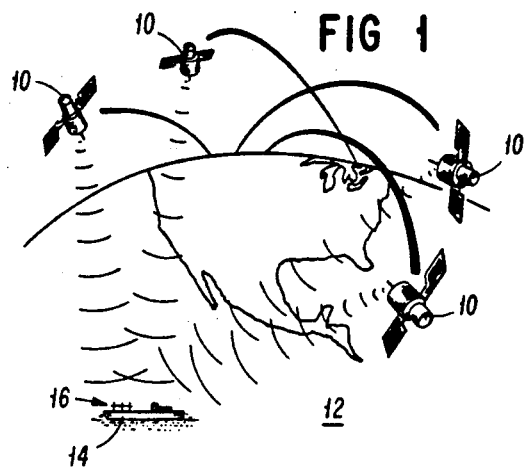
FIG. 1 provides a diagrammatic view illustrating the use of GPS satellites and their signals in accordance with the present invention.

For Example $\Delta\phi_{01}^{(2)-}$ = phase difference between signals from satellite 2 as received at antennas 0 and 1 before antenna exchange $h_x^{(1)+} - h_x^{(2)+}$ = difference between X components of unit direction vectors to satellites 1 and 2 after antenna exchange $\Delta x^-, \Delta y^-, \Delta z^-$ = components of baseline vector between antennas before exchange $N_{21}^{(3,4)}$ = difference between the initial integer ambiguities associated with the antennas 2 and 1 for satellites 3 and 4.

FIG. 5 is a system of matrix equations corresponding to the system of FIG. 4 in which the initial integer ambiguities are expressed as independent variables.

FIG. 6 is a system of matrix equations representing conditions before and after antenna rearrangement (from collinear to non-collinear positions) which may be solved in accordance with phase measurements to yield vectors indicating attitude
Where:
XA, YA, ZA = baseline vector between antennas 1 and 0, pointing from 1 to 0.
YB, YB, ZB = baseline vector between antennas 2 and 1, pointing from 2 to 1.

FIG. 7 provides a pair of equations which may be solved to yield unit direction vectors.

Figure 8A:
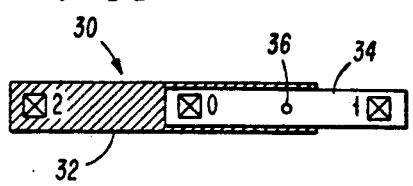

FIGS. 8a, b and c provide a diagrammatic view of the preferred embodiment of the mechanical system for antenna array configuration in accordance with the present invention also showing its operation by successive stages.

Figure 9:
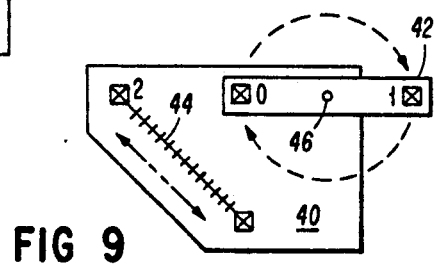

FIG. 9 provides a diagrammatic view of an alternate embodiment of the mechanical system for antenna array configuration in accordance with the present invention.

DESCRIPTION OF THE PREFERRED EMBODIMENT

Hardware System and its Operation

Referring now to FIG. 1, a set of four GPS satellites 10 are shown orbiting around the earth 12 while continuously providing GPS signals. The GPS signals broadcast by the satellites 10 may be picked up by vehicles on the surface of the Earth such as the ship 14 using an antenna structure such as the antenna array 16. The present invention allows the ship 14 to determine its direction and/or attitude from the signals provided by the satellites 10 as picked up by the antenna array 16.

Figure 2:
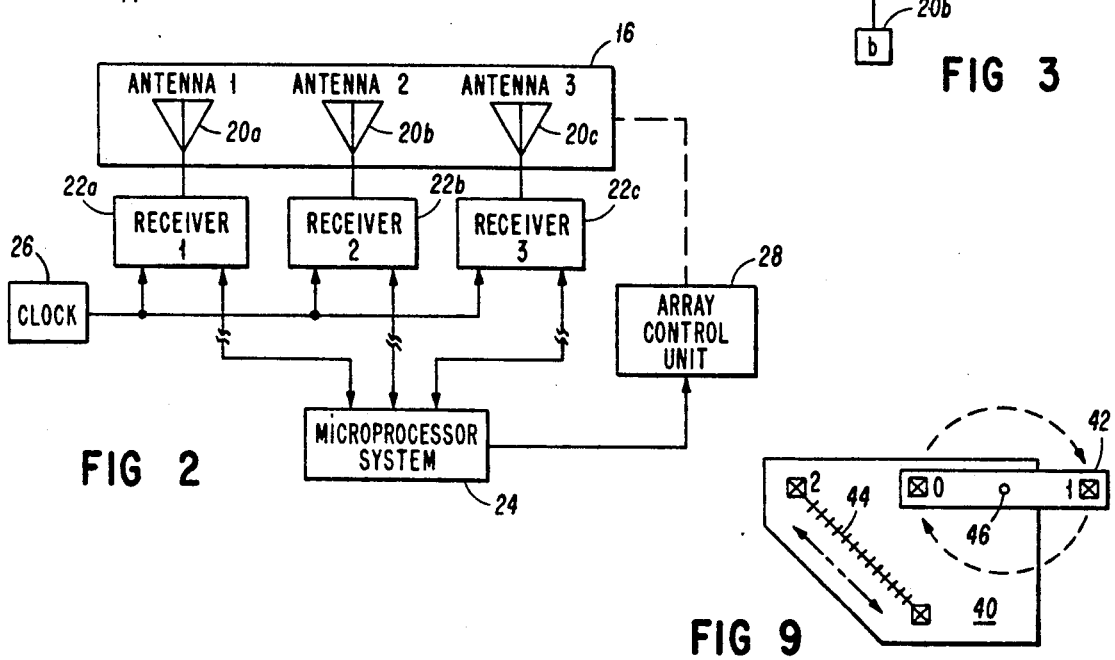
FIG. 2 provides a block diagram of a preferred embodiment of the electronic system associated with the present invention.

Referring now to FIG. 2, the antenna array 16 includes three separate antennas 20a, 20b and 20c suitable for receiving GPS signals such as microstrip patch antennas. The antennas 20a, 20b and 20c are separately connected to three multichannel radio receivers 22a, 22b and 22c adapted for receiving GPS signals from the antennas 20a, 20b and 20c and sampling the carrier phase of such signals as received at the antennas. The receivers 22a, 22b and 22c ordinarily have separate clocks but may operate in accordance with a common clock signal generated by a single clock 26 as shown in the figure whereby clock timing errors between the receivers may be eliminated. The phase measurement information generated by the receivers 22a, 22b and 22c is transferred to the microprocessor system 24 where it may be processed to yield the desired directional and/or attitude information as will be hereinafter described. The microprocessor system 24 also serves to regulate the operations of the receivers 22a, 22b and 22c and the array control unit 28. The array control unit 28 controls the configuration of the antenna array 16 so that the antennas 20a, 20b and 20c within the array 16 may be exchanged and rearranged in coordination with the taking of carrier phase measurements by the receivers 22a, 22b and 22c so that the required data may be timely acquired for properly calculating direction and attitude.

Figure 3:
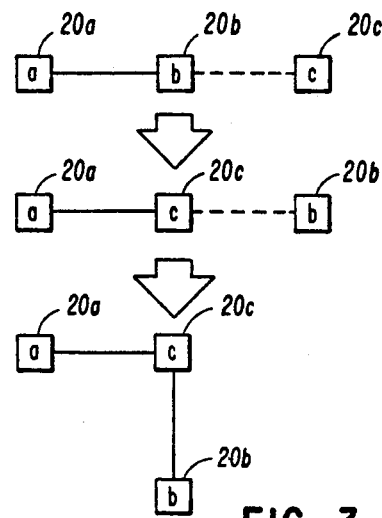
FIG. 3 provides a diagrammatic view of the geophysical relationships of the antennas comprising the antenna array of the present invention during various stages of its operation.

Referring now to FIG. 3, the antennas 20a, 20b and 20c are first arranged in a collinear pattern in which they are spaced apart by equal distances. Phase measurements are taken at each of the antennas of the signals received from each of the four satellites 10. The positions of antennas 20b and 20c are then exchanged while continuous carrier phase tracking is maintained so that the antenna 20b occupies exactly the same location as previously occupied by antenna 20c and antenna 20c occupies exactly the same position previously occupied by antenna 20b. Phase measurements are then taken at each of the antennas of the signals from each of the same four satellites 10. The antennas 20a, 20b and 20c are then rearranged in a non-collinear pattern in which the antenna 20b is located "orthogonal" (at right angles and comparatively nearby) to the line segment defined by the positions of the antennas 20a and 20c while continuous phase tracking is again maintained. Phase measurements are again taken at each of the antennas 20a, 20b and 20c of the signals from each of the same four satellites 10. Phase information comprising 36 separate phase measurements over three different antenna array configurations and associated phase tracking data may thereby be provided to the microprocessor system 24 for processing in order to determine direction and/or attitude.

Figure 8B:
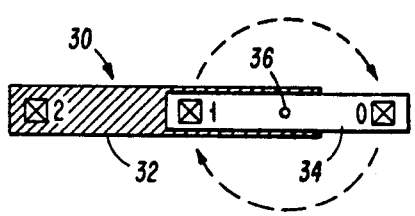
Figure 8C:
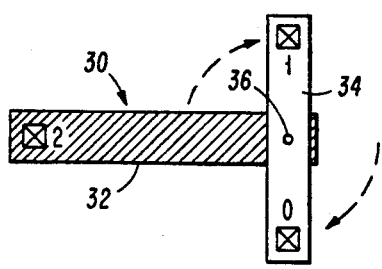

Referring now to FIGS. 8a–c, a mechanical assembly is shown which is suitable for reconfiguring the antennas 20a, 20b and 20c within the antenna array 16 as required for the operation of the present invention. The mechanical assembly 30 includes a stationary frame 32 and a lever arm 34 rotatable about a fixed pivot 36. The antenna 20a and the pivot 36 are located on opposite ends of the frame 32 while the antennas 20b and 20c are located on opposite ends of the lever arm 34. The FIGS. 8a, 8b and 8c illustrate the role of the mechanical assembly 30 in the operation of the present invention whereby it allows the antennas 20b and 20c to be physically exchanged and the array 16 to be rearranged into different pattern. FIG. 8a shows the antenna array 16 including the antennas 20a, 20b and 20c in its initial position with the antennas arranged in a collinear pattern in which they are equally spaced apart by known distances. FIG. 8b shows the antenna array 16 subsequent to the positions of the antennas 20b and 20c being exchanged with the antennas still however being in a collinear pattern and being equally spaced apart. FIG. 8c shows the antenna array 16 subsequent to rearrangement of the antennas 20a, 20b and 20c into an non-collinear pattern. The exchange and rearrangement of the antennas within the array 16 is simply accomplished by the rotation of the lever arm 34 about the pivot point 36 either by 180 degrees (in the case of an exchange) or by 90 degrees (in the case of a rearrangement). In actual practice, the lever arm 34 is driven by a servo motor actuated by the array control unit 28 under direction of the microprocessor system 24.

Referring now to FIG. 9, an alternate type of mechanical assembly 40 for exchanging and rearranging the positions of the antennas within the array 16 is shown as comprising the frame 40, lever arm 42 and track 44. The lever arm 42 is rotatable about a pivot point 46 and it performs the antenna exchange function through a 180 degree rotation. The track 44 allows an antenna 20a to be translated from a position collinear with the antennas 20b and 20c to an "orthogonal" type position non-collinear with these antennas thereby accomplishing the antenna array rearrangement function.

Mathematical Background

It should be understood that, for the sake of simplicity, the surveying examples described in the background section were one dimensional in nature. However, the principles discussed may be readily extended to higher spatial dimensions by including more spatial variables and formulating a proportionately greater number of equations as necessary to obtain solutions. The measurements required for making the system solvable may be obtained by taking proportionately greater numbers of phase samples over time or by adding additional satellites to the measurement set until there is enough additional information to overcome the undetermined condition. The mathematical calculations necessary to obtain solutions can be rapidly and easily performed by modern digital signal processing machinery such as the microprocessor system 24 shown in FIG. 2.

In determining direction and/or attitude many more variables exist than ordinarily present in surveying applications and accordingly more equations and measurement sets must be obtained in order to allow for solutions to be computed. First of all, the baseline defined by the antennas is not fixed to the GPS frame of reference for even the duration of the initialization procedure. Equation 3 describing the kinematic surveying situation may be seen to apply except that the variables $\Delta X$ and $\Delta \Phi_N$ are as yet unsolved. Consequently, three variables are now present which may be solved by forming additional equations and processing more measurements, although, further measurements from the same satellite over time are not determinative since every such measurement would simply add a different phase increment. However, by adding another satellite to the measurement set enough additional information may be acquired to overcome the undetermined condition. matrix Equation 6 illustrates the resulting system of equations for a one dimensional example. It should be noted parenthetical superscripts assigned to the variables denote an index for the satellite associated with the variable.

$$\begin{bmatrix} \Delta\phi_0^{(1)} \\ \Delta\phi_1^{(1)} \\ \Delta\phi_0^{(2)} \\ \Delta\phi_1^{(2)} \end{bmatrix} = \begin{bmatrix} \cos\theta_0^{(1)} & 0 & -1 & 0 \\ \cos\theta_1^{(1)} & \cos\theta_1^{(1)} & -1 & 0 \\ \cos\theta_0^{(2)} & 0 & 0 & -1 \\ \cos\theta_1^{(2)} & \cos\theta_1^{(2)} & 0 & -1 \end{bmatrix} \begin{bmatrix} \Delta X \\ \delta X \\ \Delta\phi_N^{(1)} \\ \Delta\phi_N^{(2)} \end{bmatrix} \quad (6)$$

The example of Equation 6 may be generalized to real life GPS by elevating the spatial dimensionality of the model and by accommodating troublesome receiver timing errors. The Equations may be generalized to three dimensions by simply including variables representing three initial positions and three incremental positions. However, the accommodation of receiver timing errors is somewhat more complicated. It is inconvenient to deal with receiver timing errors in carrier phase surveying because the error is inestimable due to the inability of the measurement situation to distinguish between the initial integer ambiguity $\Delta\Phi_N$ and timing errors $\Delta t$ both of which reside in the range/measurement space of the model. Nevertheless, timing errors may be accommodated by eliminating them from consideration altogether through proper mathematical handling. This end can be realized by forming so called "double difference" expressions between pairs of satellites which can be made from single difference phase measurements between pairs of antennas. Equation (or expression) 7:

$$\Delta\phi_{01}^{(1)} - \Delta\phi_{01}^{(2)} \quad (7)$$

illustrates a typical double difference expression in which superscripts reference satellites and subscripts reference antenna pairings. If phase measurements are made nearly simultaneously from both satellites at the two antennas, the timing errors conveniently cancel out in the double difference expression so formed. The number of double difference measurements always turn out to be one less than the total number of satellites being tracked and therefore one additional satellite must be added to the measurement set to allow the equations to be formulated in terms of double difference expressions.

Again, referring to the example of Equation 6 and its generalization to three dimensions, six initial integer variables corresponding to six satellite pairs are required to provide 12 double difference equations (at two time points) and to thereby match the variables generated: three initial positions, three incremental positions and six initial integer ambiguities. Therefore, a total of seven satellites would be required to satisfy this model when the additional satellite necessary to set up the double difference expressions is included. The above principles would allow a baseline between two antennas to be determined although the procedure would appear to be cumbersome in requiring both a substantial time interval over which measurements must be made and the simultaneous tracking of seven satellites. Nevertheless, it should be noted that the principles referred to above would allow for the determination of a direction and in an application of GPS Satellites unrecognized previous to this time.

The original antenna exchange technique called for a mutual exchange of antennas between fixed locations in which the baseline used between the antennas was required to remain unchanged during the period of the exchange. In accordance with the original technique, there would be no way to determine the original locations of the antennas if they were subject to movement. Nevertheless, an extension of the antenna exchange technique to a mobile platform can be accomplished if the spatial relationship between the antennas during the exchange is either known or maintained and an additional antenna is used to form a three antenna array. This amounts to a substantial simplification of the non-static initialization problem whereby solutions can be immediately calculated enabling practical applications of the technique to vehicular platforms of moderate dynamics such as ships and transport aircraft and space structure.

The antenna array must remain rigidly fixed to the moving platform whose direction and/or attitude is to be determined and be constructed so as to allow the position of a pair of antennas to be exchanged and to allow the pattern of the antennas to be changed in the case of attitude determinations as will be hereinafter explained. In the most straightforward case, the antennas within an array would be collinear and the spaced apart by known and equal distances. These conditions may be readily fulfilled allowing the feasibility of many practical applications.

Referring now to FIG. 4, a system of equations is shown employing double difference phase expressions in which phase measurements from four satellites provide three double differences for each of two antenna pairs. Therefore, by making measurements both before and after antenna exchange, a total of twelve measurements are provided as required to solve twelve variables; three positions before exchange, three positions after exchange and six initial integers. The variables $\Delta X+$, $\Delta Y+$, $\Delta Z+$ define a vector representing the baseline running between the antennas which corresponds to a direction for the antenna array and also the platform on which it is mounted immediately subsequent to the completion of antenna exchange.

The system of equations shown in FIG. 4 may be partially solved to yield the system shown in FIG. 5 whereby the initial integer ambiguities corresponding to the double difference measurements may be readily solved by means of a constant coefficient matrix. Now, not only direction but also attitude may be calculated with the knowledge of these initial integer ambiguities, if the antenna array is rearranged so that one of the antennas is non-collinear with the others while phase tracking is maintained and a further set of phase measurements is made with respect to the same four satellites.

Referring now to FIG. 6, the system of equations shown allows the vectors $X_A, Y_A, Z_A$ and $X_B, Y_B, Z_B$ to be immediately calculated representing the coordinates of the two baselines defined by the antenna positions within the array which correspond to the attitude of the array and the platform upon which it is mounted. In order to further complete this process the two vectors may be normalized through the use of the formulas shown in FIG. 7 so that the required directions are expressed in terms of unit vectors useful in subsequent calculations. The orientational information represented by the vectors may then be converted to any desired format such as Euler angles or the like.

While particular embodiments of the present invention have been shown and described, it should be clear that changes and modifications may be made to such embodiments without departing from the true scope and spirit of the invention. For example, the receivers 20a–c may be synchronized to a common clock signal such as the signal provided by the clock 26 thereby eliminating timing errors between the receivers and allowing the equations of FIG. 4 to be written in terms of single difference expressions. This simplification may reduce the required number of satellites in the measurement set from 4 to 3 satellites, although careful calibration of the timing for the clock signals provided to the separate receivers is necessary to achieve accurate results. Further by way of example, certain of the functions of receivers 22a, 22b and 22c may be implemeted in a single module having sufficient multichannel capacity thereby reducing the amount of electronic hardware necessary for the operation of the system. It is intended that the appended claims cover all such changes and modifications.

I claim:

1. A method for determining attitude using GPS satellites and an antenna array including a plurality of antennas in which the positions of the antennas within the array may be selectively reconfigured, comprising the steps of:
    arranging said antennas in a collinear pattern in which said antennas are spaced apart by known distances;
    receiving and phase sampling signals from a plurality of GPS satellites with each of said antennas;
    exchanging the positions of a pair of said antennas within said array while maintaining continuous phase tracking;
    receiving and phase sampling signals from said plurality of GPS satellites with each of said antennas;
    rearranging said antennas in a non-collinear pattern in which said antennas are spaced apart by known distances while maintaining continuous phase tracking;
    receiving and phase sampling signals from said plurality of GPS satellites with each of said antennas; and
    calculating the attitude of said antenna array based on the phase of said GPS signals received and sampled in the previous steps.

2. The method of claim 1 in which said plurality of GPS satellites includes four separate satellites and wherein receiver clock timing errors are eliminated from the attitude calculations by double differencing phase measurements between separate antennas and separate satellites.

3. The method of claim 1 in which said antenna array includes three separate antennas which are equally spaced apart in said collinear pattern and one of which is orthogonally positioned with respect to the others in said non-collinear pattern.

4. The method of claim 1, in which the step of calculating the attitude of said antenna array includes the steps of computing a set of double difference phase integer ambiguities between separate antennas and computing the coordinates of baseline and orthogonal vectors using further phase measurements and said phase integer ambiguities.

5. An apparatus for determining attitude using signals from a set of GPS satellites, comprising:
    a plurality of antennas configurable into an array for receiving said signals at spaced apart locations;
    means for exchanging the positions of a pair of said antennas within said array and also rearranging the positions of said antennas within said array from collinear to non-collinear patterns;
    means for sampling the phase of said signals received by said antennas from said GPS satellites at the positions of each of said antennas before an antenna exchange, after an antenna exchange and after an antenna rearrangement and for tracking the phase of said signals from said GPS antennas during antenna exchange and rearrangement; and
    means for calculating the attitude of said antenna array based on the measured phase of said signals.

6. The apparatus of claim 5 in which said set of GPS satellites includes four separate satellites and wherein receiver clock timing errors are eliminated from attitude calculations performed by said means for calculating by double differencing phase measurements between separate antennas and separate satellites.

7. The apparatus of claim 5 in which said antenna array includes three separate antennas which are equally spaced apart when arranged in said collinear pattern and one of which is orthogonally positioned with respect to the others when arranged in said non-collinear pattern.

8. The apparatus of claim 5, in which said set of GPS satellites includes three separate satellites and wherein one set of receiver clock timing errors are eliminated by synchronizing the receiver functions associated with the antennas to a common clock signal.

9. A method for determining direction and attitude using a set of GPS satellites and a system including an array of three or more antennas, one or more GPS radio receivers coupled to said antennas, and a computing means for processing the information acquired by said antennas and receivers, said method comprising the steps of:
    configuring said array of antennas in a first predetermined pattern in which said antennas are spaced-apart by known distances;
    sampling the phase of the GPS signals from said GPS satellites using said antennas and receivers;
    exchanging the positions of a pair of said antennas while continuously tracking the phase of the GPS signals;
    sampling the phase of the GPS signals from said GPS satellites using said antennas and receivers; and
    reconfiguring said array of antennas in a second different predetermined pattern in which said antennas are spaced apart by known distances while continuously tracking the phase of said signals;
    sampling the phase of said GPS signals from said GPS satellites using said antennas and receivers; and
    computing the direction and attitude of said antenna array using said computing means.

10. The method of claim 9, wherein the antennas within said first predetermined pattern are collinear.

11. The method of claim 9 in which said set of GPS satellites includes four separate satellites and wherein receiver clock timing errors are eliminated from the directional computations by double differencing phase measurements between separate antennas and separate satellites.

12. The method of claim 9 in which said set of GPS satellites includes three separate satellites and wherein one set of receiver clock timing errors are eliminated by synchronizing the receiver functions associated with the antennas to a common clock signal.

13. An apparatus for determining direction using phase information derived from the signals provided by a set of GPS satellites, said apparatus comprising:
- a plurality of antennas configurable into an antenna array in which the antennas are spaced apart by known distances:
- one or more radio receivers coupled to said antennas which are adapted for sampling and continuously tracking the phase of said GPS signals as received by said antennas at their individual locations:
- means for exchanging the positions of a pair of said antennas and rearranging said array into collinear and non-collinear patterns; and
- means for processing data from said receivers and calculating the direction and attitude of said array based on the measured phase of said GPS signals from said satellites.

14. The apparatus of claim 13 in which said set of GPS satellites includes four separate satellites and wherein receiver clock timing errors are eliminated from attitude calculations performed by said microprocessor means by double differencing phase measurements between separate antennas and separate satellites.

15. The apparatus of claim 13 in which said antenna array includes three separate antennas which are equally spaced apart when arranged in said collinear pattern and one of which is orthogonally positioned with respect to the others when arranged in said non-collinear pattern.

* * * * *